United States Patent
Li et al.

(10) Patent No.: US 9,755,555 B2
(45) Date of Patent: Sep. 5, 2017

(54) DRIVE CIRCUIT FOR A PERMANENT MAGNET MOTOR

(71) Applicant: Johnson Electric S.A., Murten (CH)

(72) Inventors: Yue Li, Hong Kong (CN); Chi Ping Sun, Hong Kong (CN); Bao Ting Liu, Shenzhen (CN); En Hui Wang, Shenzhen (CN); Fei Xin, Shenzhen (CN); Shing Hin Yeung, Hong Kong (CN); Xiu Wen Yang, Shenzhen (CN); Yan Yun Cui, Shenzhen (CN); Shu Juan Huang, Shenzhen (CN)

(73) Assignee: Johnson Electric S.A., Murten (CH)

(*) Notice: Subject to any disclaimer, the term of this patent is extended or adjusted under 35 U.S.C. 154(b) by 10 days.

(21) Appl. No.: 14/822,353

(22) Filed: Aug. 10, 2015

(65) Prior Publication Data
US 2016/0043672 A1    Feb. 11, 2016

(30) Foreign Application Priority Data

Aug. 8, 2014 (CN) .......................... 2014 1 0390592
Aug. 15, 2014 (CN) .......................... 2014 1 0404474

(51) Int. Cl.
| | |
|---|---|
| *H02P 25/02* | (2016.01) |
| *H02P 6/20* | (2016.01) |
| *H02P 7/295* | (2016.01) |
| *H02P 6/16* | (2016.01) |
| *H02P 6/30* | (2016.01) |
| *H02P 7/03* | (2016.01) |
| *G01D 5/14* | (2006.01) |

(52) U.S. Cl.
CPC .............. *H02P 6/20* (2013.01); *G01D 5/142* (2013.01); *H02P 6/16* (2013.01); *H02P 6/30* (2016.02); *H02P 7/05* (2016.02); *H02P 7/295* (2013.01); *H02P 2207/05* (2013.01)

(58) Field of Classification Search
CPC ....................................................... H02P 25/14
USPC ........................ 318/400.15; 388/821; 60/531
See application file for complete search history.

(56) References Cited

U.S. PATENT DOCUMENTS

| | | | | |
|---|---|---|---|---|
| 4,002,959 A | * | 1/1977 | Schadlich | ............... H02P 25/14 318/245 |
| 4,949,214 A | * | 8/1990 | Spencer | ................. G03G 15/16 361/42 |
| 5,675,226 A | | 10/1997 | Riola' | |

(Continued)

FOREIGN PATENT DOCUMENTS

| | | | |
|---|---|---|---|
| CN | 201409107 Y | * | 2/2010 |
| DE | 102006055482 | | 6/2008 |

*Primary Examiner* — Eduardo Colon Santana
*Assistant Examiner* — Cortez Cook
(74) *Attorney, Agent, or Firm* — Muncy, Geissler, Olds & Lowe, P.C.

(57) ABSTRACT

A drive circuit for an electric motor connected in series with an AC power source between a first node and a second node. The drive circuit includes a controllable bidirectional AC switch, an AC-DC conversion circuit connected in parallel with the controllable bidirectional AC switch between the first node and the second node, a position sensor configured to detect a position of a rotor of the motor, and a switch control circuit configured to control the controllable bidirectional AC switch to be conductive or non-conductive in a predetermined way, based on the position of the rotor and a polarity of the AC power source.

20 Claims, 5 Drawing Sheets

(56) References Cited

U.S. PATENT DOCUMENTS

| | | | | |
|---|---|---|---|---|
| 5,682,459 A | * | 10/1997 | Wilkerson | H02P 7/2855 318/109 |
| 2007/0271915 A1 | * | 11/2007 | Safran | F03G 7/06 60/531 |
| 2010/0207557 A1 | * | 8/2010 | Wilkinson | H02P 1/22 318/400.15 |

* cited by examiner

DRIVE CIRCUIT FOR A PERMANENT MAGNET MOTOR

CROSS REFERENCE TO RELATED APPLICATIONS

This non-provisional patent application claims priority under 35 U. S. C. §119(a) from Patent Application No. 201410390592.2 filed in The People's Republic of China on Aug. 8, 2014, and from Patent Application No. 201410404474.2 filed in The People's Republic of China on Aug. 15, 2014, the entire contents of which are hereby incorporated by reference.

FIELD OF THE INVENTION

This invention relates to a driver or drive circuit for a permanent magnetic motor, especially for a low-power permanent magnetic motor as used, for example, to drive a small fan or a small water pump.

BACKGROUND OF THE INVENTION

During starting of a synchronous motor, the stator produces an alternating magnetic field causing the permanent magnetic rotor to be oscillated. The amplitude of the oscillation of the rotor increases until the rotor begins to rotate, and finally the rotor is accelerated to rotate in synchronism with the alternating magnetic field of the stator. To ensure the starting of a conventional synchronous motor, a starting point of the motor is set to be low, which results in that the motor cannot operate at a relatively high working point, thus the efficiency is low. In another aspect, the rotor cannot be ensured to rotate in a same direction every time since a stop or stationary position of the permanent magnetic rotor is not fixed. Accordingly, in applications such as a fan and water pump, the impeller driven by the rotor has straight radial vanes, which results in a low operational efficiency of the fan and water pump.

FIG. 1 shows a conventional drive circuit for a synchronous motor, which allows a rotor to rotate in a same predetermined direction in every time it starts. In the circuit, a stator winding 1 of the motor is connected in series with a TRIAC between two terminals M and N of an AC power source VM, and an AC power source VM is converted by a conversion circuit DC into a direct current voltage and the direct current is supplied to a position sensor H. A magnetic pole position of a rotor in the motor is detected by the position sensor H, and an output signal Vh of the position sensor H is connected to a switch control circuit PC to control the bidirectional thyristor T. FIG. 2 shows a waveform of the drive circuit. It can be seen from FIG. 2 that, in the drive circuit, no matter the bidirectional thyristor T is switched on or off, the AC power source supplies power for the conversion circuit DC so that the conversion circuit DC constantly outputs and supplies power for the position sensor H (referring to a signal VH in FIG. 2). In a low-power application, in a case that the AC power source is commercial electricity of about 200V, the electric energy consumed by two resistors R2 and R3 in the conversion circuit DC is more than the electric energy consumed by the motor.

SUMMARY OF THE INVENTION

Hence there is a desire for an improved drive circuit for a permanent magnet motor.

Accordingly, in one aspect thereof, the present invention provides a drive circuit for a permanent magnet motor comprising a stator and a permanent magnet rotor, the stator comprising a stator core and a stator winding wound on the stator core and adapted to be connected in series with an AC power source between a first node and a second node, the drive circuit comprising: a controllable bidirectional AC switch connected between the first node and the second node; an AC-DC conversion circuit connected in parallel with the controllable bidirectional AC switch between the first node and the second node, wherein there is no current flowing through the AC-DC conversion circuit when the first node and the second node are shorted by the controllable bidirectional AC switch; a position sensor configured to detect a magnetic pole position of the permanent magnet rotor; and a switch control circuit configured to control the controllable bidirectional AC switch to be switched between a switch-on state and a switch-off state in a predetermined way, based on the magnetic pole position of the permanent magnet rotor and the polarity of the AC power source such that the stator winding drives the rotor to rotate only in a fixed direction.

Preferably, the controllable bidirectional AC switch includes a TRIAC.

Preferably, a first anode of the TRIAC is connected to the first node, a second anode of the TRIAC is connected to the second node, and a control electrode of the TRIAC is connected to the switch control circuit.

Preferably, the AC-DC conversion circuit comprises a full wave rectifying circuit having a high voltage output terminal and a low voltage output terminal.

Preferably, a zener diode is connected between the high voltage output terminal and the low voltage output terminal.

Preferably, the AC-DC conversion circuit comprises a first diode and a second diode which are reversely connected in parallel between the first node and the second node respectively via a first resistor and a second resistor, a high voltage output terminal of the AC-DC conversion circuit is formed at a connection point of the first resistor and a cathode of the first diode, a low voltage output terminal of the AC-DC conversion circuit is formed at a connection point of the second resistor and an anode of the second diode, and the first diode and the second diode are zener diodes.

Preferably, the AC-DC conversion circuit comprises a first resistor connected in series with the full wave bridge rectifier between the first node and the second node.

Preferably, the full wave bridge rectifier comprises two rectifier branches connected in parallel, one of the two rectifier branches comprising a first diode and a third diode reversely connected in series, and the other of the two rectifier branches comprises a second diode and a fourth diode reversely connected in series, the high voltage output terminal of the AC-DC conversion circuit is formed at a connection point of a cathode of the first diode and a cathode of the third diode, and the low voltage output terminal of the AC-DC conversion circuit is formed at a connection point of an anode of the second diode and an anode of the fourth diode.

Preferably, the second diode and the fourth diode are zener diodes.

Preferably, the full wave bridge rectifier comprises two rectifier branches connected in parallel, one of the two rectifier branches comprises two silicon control rectifiers reversely connected in series, and the other of the two rectifier branches comprises a second diode and a fourth diode reversely connected in series, the high voltage output terminal of the AC-DC conversion circuit is foamed at a connection point of cathodes of the two silicon control rectifiers, and the low voltage output terminal of the AC-DC conversion circuit is formed at a connection point of an anode of the second diode and an anode of the fourth diode.

Preferably, a first signal terminal connects the cathodes of the two silicon control rectifiers and a second signal terminal connects the control terminals of the two silicon control rectifiers, wherein the first signal terminal is connected to a reference voltage; a control signal input from the second signal terminal ensures the two silicon control rectifiers to be switched between a switch-on state and a switch-off state in a predetermined way in a case that the drive circuit operates normally, or a control signal input from the second signal terminal enables the two silicon control rectifiers to be switched off in a case that the drive circuit fails.

Preferably, the AC-DC conversion circuit has a high voltage output terminal and a low voltage output terminal, the switch control circuit comprises a first terminal connected to the high voltage output terminal, a second terminal connected to an output terminal of the position sensor, and a third terminal connected to the control electrode of the controllable bidirectional AC switch, the high voltage output terminal of the AC-DC conversion circuit is connected to a positive power supply terminal of the position sensor, and a low voltage output terminal of the AC-DC conversion circuit is connected to a negative power supply terminal of the position sensor.

Preferably, a preset steering circuit is disposed between the third terminal of the switch control circuit and the control electrode of the controllable bidirectional AC switch, and the preset steering circuit comprises a first jumper switch connected between the third terminal and the control electrode of the controllable bidirectional AC switch, and a second jumper switch and an inverter connected in series which are connected in parallel with the first jumper switch between the third terminal and the control electrode.

Preferably, the switch control circuit further comprises a third resistor, a fourth resistor, and a fifth diode and a sixth diode reversely connected in series between the output terminal of the position sensor and the control electrode of the controllable bidirectional AC switch; a cathode of the fifth diode is connected to the output terminal of the position sensor, and a cathode of the sixth diode is connected to the control electrode of the controllable bidirectional AC switch; one terminal of the third resistor is connected to the high voltage output terminal of the AC-DC conversion circuit, and the other terminal of the third resistor is connected to a connection point of an anode of the fifth diode and an anode of the sixth diode; and two terminals of the fourth resistor are connected to a cathode of the fifth diode and a cathode of the sixth diode respectively.

Preferably, the switch control circuit further comprises a third resistor, a fifth diode, and a fourth resistor and a sixth diode connected in series between the output terminal of the position sensor and the control electrode of the controllable bidirectional AC switch; an anode of the sixth diode is connected to the control electrode of the controllable bidirectional AC switch; one terminal of the third resistor is connected to the high voltage output terminal of the AC-DC conversion circuit, and the other terminal of the third resistor is connected to a connection point of an anode of the fifth diode and the output terminal of the position sensor; and a cathode of the fifth diode is connected to the control electrode of the controllable bidirectional AC switch.

Preferably, the switch control circuit further comprises a third resistor, an NPN transistor, and a fourth resistor and a fifth diode connected in series between the output terminal of the position sensor and the control electrode of the controllable bidirectional AC switch; a cathode of the fifth diode is connected to the output terminal of the position sensor; one terminal of the third resistor is connected to the high voltage output terminal of the AC-DC conversion circuit, and the other terminal of the third resistor is connected to the output terminal of the position sensor; and a base of the NPN transistor is connected to the output terminal of the position sensor, an emitter of the NPN transistor is connected to an anode of the fifth diode, and a collector of the NPN transistor is connected to the high voltage output terminal of the AC-DC conversion circuit.

Preferably, a non-uniform gap is formed between the stator and the permanent magnet rotor, and a polar axis of the permanent magnet rotor has an angular offset relative to a central axis of the stator when the permanent magnet rotor is at rest.

Preferably, the permanent magnetic rotor operates at a constant rotational speed of 60 f/p during a steady state operation of the motor, where f is a frequency of the AC power source and p is the number of pole pairs of the rotor.

According to a second aspect, the present invention provides a drive circuit for an electric motor adapted to be connected in series with an AC power source between a first node and a second node, the drive circuit comprising: a controllable bidirectional AC switch; an AC-DC conversion circuit connected in parallel with the controllable bidirectional AC switch between the first node and the second node; a position sensor configured to detect a position of a rotor of the motor; and a switch control circuit configured to control the controllable bidirectional AC switch to be conductive or non-conductive in a preset way based on the position of the rotor and a polarity of the AC power source.

According to a third aspect, the present invention provides a drive circuit for a synchronous motor comprising a stator and a rotor rotatable relative to the stator, the stator comprising a stator core and a stator winding wound on the stator core and adapted to be connected in series with an AC power source between a first node and a second node, the rotor comprising at least one permanent magnet and operating at a constant rotational speed of 60 f/p during a steady state phase of the motor, where f is a frequency of the AC power supply and p is the number of pole pairs of the rotor, wherein the drive circuit comprises: a controllable bidirectional AC switch; an AC-DC conversion circuit connected in parallel with the controllable bidirectional AC switch between the first node and the second node; a position sensor configured to detect a position of the rotor; and a switch control circuit configured to control the controllable bidirectional AC switch to be conductive or non-conductive in a preset way based on the position of the rotor and a polarity of the AC power source such that the stator winding drives the rotor to rotate only in a predetermined direction during a starting phase of the motor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
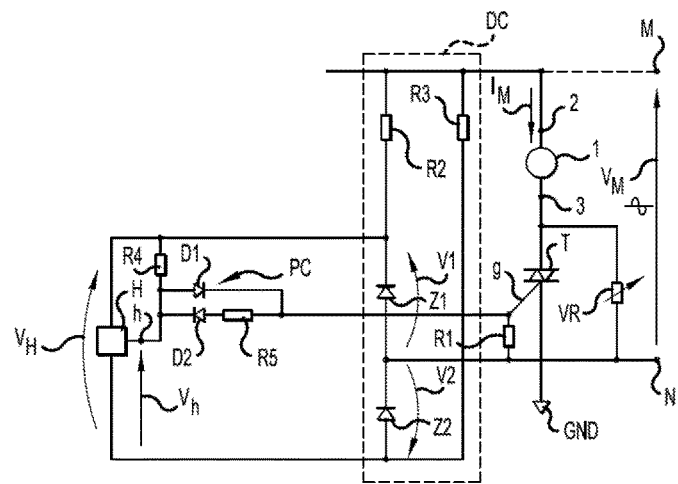
FIG. 1 shows a prior art drive circuit for a synchronous motor.
Figure 2:
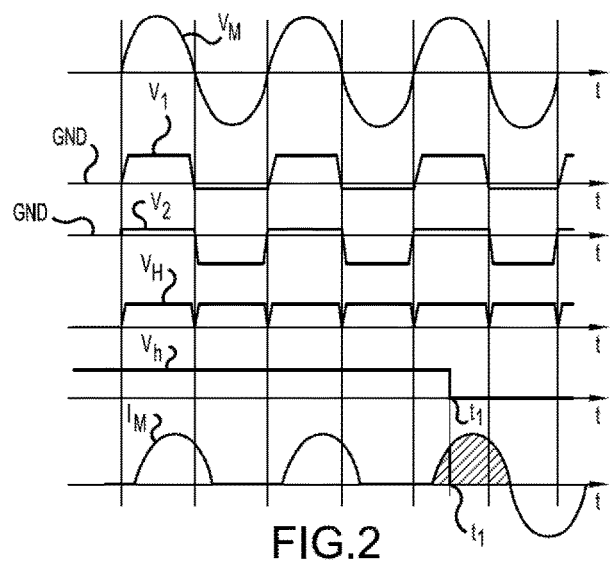
FIG. 2 shows a waveform of the drive circuit shown in FIG. 1.
Figure 3:
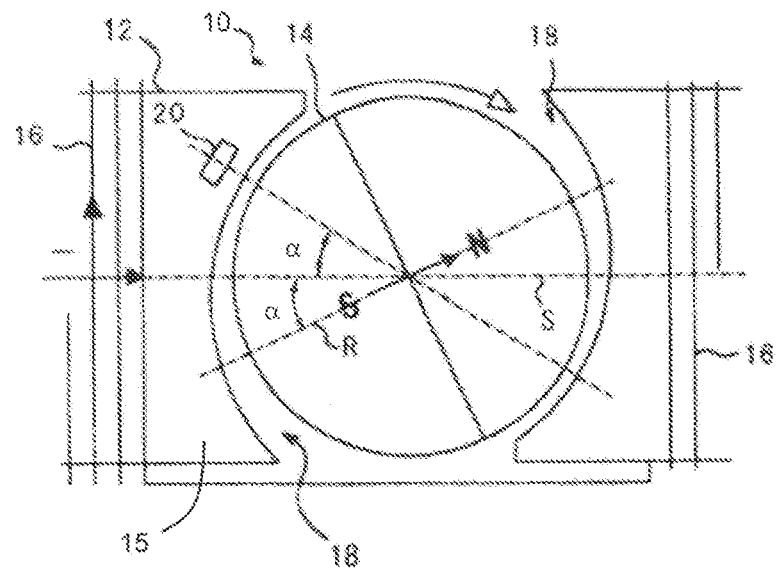
FIG. 3 is a diagrammatic representation of a synchronous motor according to the present invention.

FIG. 3 schematically shows a synchronous motor according to an embodiment of the present invention. The synchronous motor 10 includes a stator 12 and a permanent magnet rotor 14 rotatably disposed between magnetic poles of the stator 12, and the stator 12 includes a stator core 15 and a stator winding 16 wound on the stator core 15. The rotor 14 includes at least one permanent magnet forming at least one pair of permanent magnetic poles with opposite polarities, and the rotor 14 operates at a constant rotational speed of 60 f/p during a steady state phase in a case that the stator winding 16 is connected to an AC power supply, where f is a frequency of the AC power supply and p is the number of pole pairs of the rotor.

Non-uniform gap 18 is formed between the magnetic poles of the stator 12 and the permanent magnetic poles of the rotor 14 so that a polar axis R of the rotor 14 has an angular offset a relative to a central axis S of the stator 12 in a case that the rotor is at rest. The rotor 14 may be configured to have a fixed starting direction (a clockwise direction in this embodiment as shown by the arrow in FIG. 3) every time the stator winding 16 is energized. The stator and the rotor each have two magnetic poles as shown in FIG. 3. It can be understood that, in other embodiments, the stator and the rotor may also have more magnetic poles, such as 4 or 6 magnetic poles.

A position sensor 20 for detecting the angular position of the rotor is disposed on the stator 12 or at a position near the rotor inside the stator, and the position sensor 20 has an angular offset relative to the central axis S of the stator. Preferably, this angular offset is also α, as in this embodiment. Preferably, the position sensor 20 is a Hall effect sensor.

Figure 4:
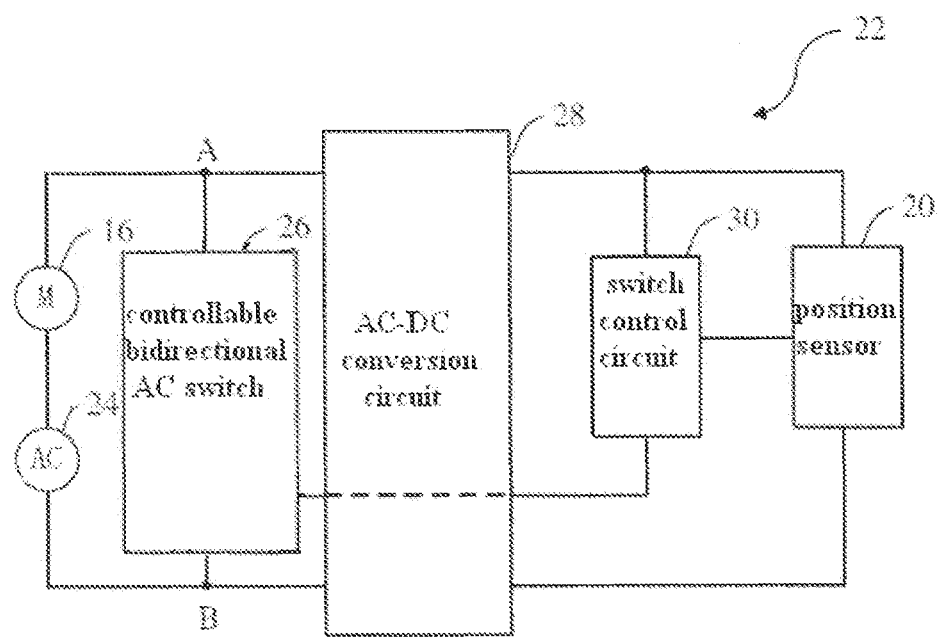
FIG. 4 is a block diagram of a drive circuit for a synchronous motor according to the present invention.

FIG. 4 shows a block diagram of a drive circuit for a synchronous motor according to an embodiment of the present invention. In the drive circuit 22, the stator winding 16 and the AC power supply 24 are connected in series between two nodes A and B. Preferably, the AC power supply 24 may be a commercial AC power supply with a fixed frequency, such as 50 Hz or 60 Hz, and a supply voltage may be, for example, 110V, 220V or 230V. A controllable bidirectional AC switch 26 is connected between the two nodes A and B, in parallel with the stator winding 16 and the AC power supply 24. Preferably, the controllable bidirectional AC switch 26 is a TRIAC, of which two anodes are connected to the two nodes A and B respectively. It can be understood that, the controllable bidirectional AC switch 26 alternatively may be two silicon control rectifiers reversely connected in parallel, and control circuits may be correspondingly configured to control the two silicon control rectifiers in a preset way. An AC-DC conversion circuit 28 is also connected between the two nodes A and B. An AC voltage between the two nodes A and B is converted by the AC-DC conversion circuit 28 into a low voltage DC. The position sensor 20 may be powered by the low voltage DC output by the AC-DC conversion circuit 28, for detecting the magnetic pole position of the permanent magnet rotor 14 of the synchronous motor 10 and outputting a corresponding signal. A switch control circuit 30 is connected to the AC-DC conversion circuit 28, the position sensor 20 and the controllable bidirectional AC switch 26, and is configured to control the controllable bidirectional AC switch 26 to be switched between a switch-on state and a switch-off state in a predetermined way, based on the magnetic pole position of the permanent magnet rotor which is detected by the position sensor and polarity information of the AC power supply 24 which may be obtained from the AC-DC conversion circuit 28, such that the stator winding 16 urges the rotor 14 to rotate only in the above-mentioned fixed starting direction during a starting phase of the motor. According to this embodiment of the present invention, in a case that the controllable bidirectional AC switch 26 is switched on, the two nodes A and B are shorted, the AC-DC conversion circuit 28 does not consume electric energy since there is no current flowing through the AC-DC conversion circuit 28, hence, the utilization efficiency of electric energy can be improved significantly.

Figure 5:
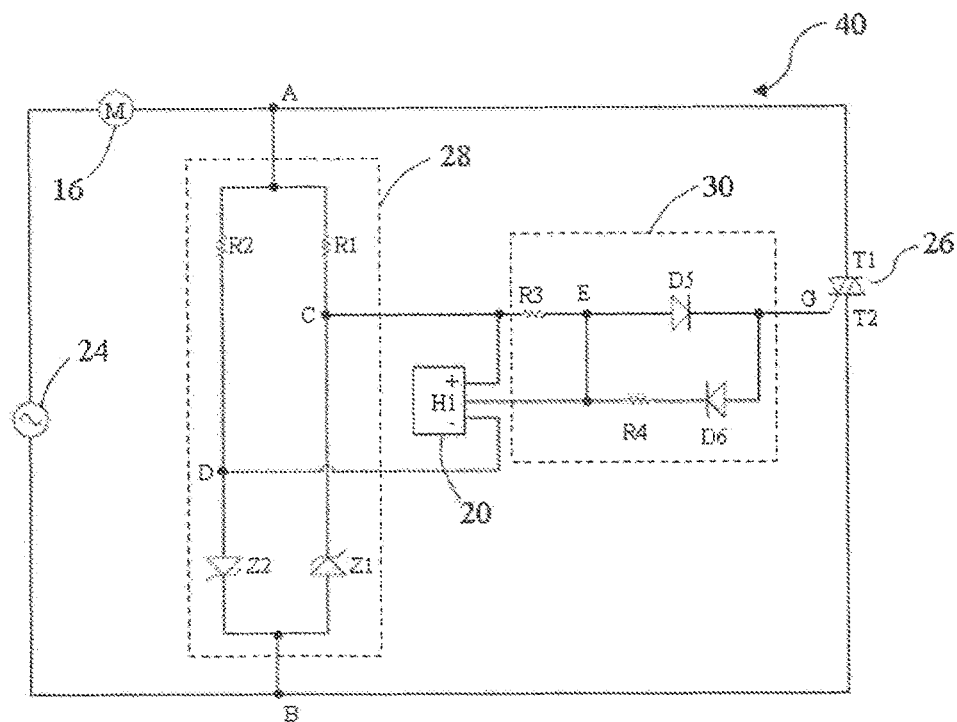
FIG. 5 shows a drive circuit for a synchronous motor according to an embodiment of the present invention.

FIG. 5 shows a circuit diagram of a drive circuit 40 for a synchronous motor according to a first embodiment of the present disclosure. The stator winding 16 of the synchronous motor is connected in series with the AC power supply 24 between the two nodes A and B. A first anode T1 of the TRIAC 26 is connected to the node A, and a second anode T2 of the TRIAC 26 is connected to the node B. The AC-DC conversion circuit 28 is connected in parallel with the TRIAC 26 between the two nodes A and B. An AC voltage between the two nodes A and B is converted by the AC-DC conversion circuit 28 into a low voltage DC (preferably, low voltage ranges from 3V to 18V). The AC-DC conversion circuit 28 includes a first zener diode Z1 and a second zener diode Z2 which are reversely connected in parallel between the two nodes A and B via a first resistor R1 and a second resistor R2 respectively. A high voltage output terminal C of the AC-DC conversion circuit 28 is formed at a connection point of the first resistor R1 and a cathode of the first zener diode Z1, and a low voltage output terminal D of the AC-DC conversion circuit 28 is formed at a connection point of the second resistor R2 and an anode of the second zener diode Z2. The voltage output terminal C is connected to a positive power supply terminal of the position sensor 20, and the voltage output terminal D is connected to a negative power supply terminal of the position sensor 20. Three terminals of the switch control circuit 30 are connected to the high voltage output terminal C of the AC-DC conversion circuit 28, an output terminal H1 of the position sensor 20 and a control electrode G of the TRIAC 26 respectively. The switch control circuit 30 includes a third resistor R3, a fifth diode D5, and a fourth resistor R4 and a sixth diode D6 connected in series between the output terminal H1 of the position sensor 20 and the control electrode G of the controllable bidirectional AC switch 26. An anode of the sixth diode D6 is connected to the control electrode G of the controllable bidirectional AC switch 26. One terminal of the third resistor R3 is connected to the high voltage output terminal C of the AC-DC conversion circuit 28, and the other terminal of the third resistor R3 is connected to an anode of the fifth diode D5. A cathode of the fifth diode D5 is connected to the control electrode G of the controllable bidirectional AC switch 26.

Figure 6:
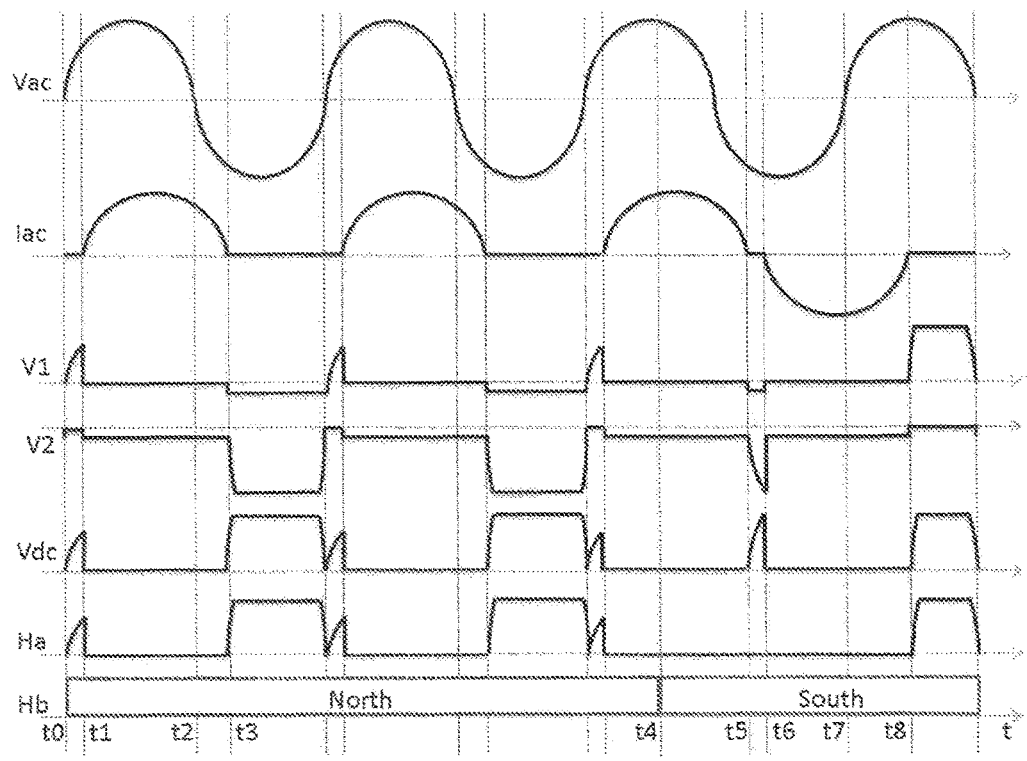
FIG. 6 shows a waveform of the drive circuit shown in FIG. 5.

In conjunction with FIG. 6, an operational principle of the drive circuit 40 is described. In FIG. 6, Vac indicates a waveform of voltage of the AC power supply 24, and Iac indicates a waveform of current flowing through the stator winding 16. Due to the inductive character of the stator winding 16, the waveform of current Iac lags behind the waveform of voltage Vac. V1 indicates a waveform of voltage between two terminals of the first zener diode Z1, V2 indicates a waveform of voltage between two terminals of the second zener diode Z2, Vdc indicates a waveform of voltage between two output terminals C and D of the AC-DC conversion circuit 28, Ha indicates a waveform of a signal output by the output terminal H1 of the position sensor 20, and Hb indicates a rotor magnetic field detected by the position sensor 20. In this embodiment, in a case that the position sensor 20 is powered normally, the output terminal H1 outputs a logic high level in a case that the detected rotor magnetic field is North, or the output terminal H1 outputs a logic low level in a case that the detected rotor magnetic field is South.

In a case that the rotor magnetic field Hb detected by the position sensor 20 is North, in a first positive half cycle of the AC power supply, the supply voltage is gradually increased from a time instant t0 to a time instant t1, the output terminal H1 of the position sensor 20 outputs a high level, and a current flows through the resistor R1, the resistor R3, the diode D5 and the control electrode G and the second anode T2 of the TRIAC 26 sequentially. The TRIAC 26 is switched on in a case that a drive current flowing through the control electrode G and the second anode T2 is greater than a gate triggering current Ig. Once the TRIAC 26 is switched on, the two nodes A and B are shorted, a current flowing through the stator winding 16 in the motor is gradually increased until a large forward current flows through the stator winding 16 to drive the rotor 14 to rotate clockwise as shown in FIG. 3. Since the two nodes A and B are shorted, there is no current flowing through the AC-DC conversion circuit 28 from the time instant t1 to a time instant t2. Hence, the resistors R1 and R2 do not consume electric energy, and the output of the position sensor 20 is stopped due to no power is supplied. Since the current flowing through two anodes T1 and T2 of the TRIAC 26 is large enough (which is greater than a holding current Ihold), the TRIAC 26 is kept to be switched on in a case that there is no drive current flowing through the control electrode G and the second anode T2. In a negative half cycle of the AC power supply, after a time instant t3, a current flowing through T1 and T2 is less than the holding current Ihold, the TRIAC 26 is switched off, a current begins to flow through the AC-DC conversion circuit 28, and the output terminal H1 of the position sensor 20 outputs a high level again. Since a potential at the point C is lower than a potential at the point E, there is no drive current flowing through the control electrode G and the second anode T2 of the TRIAC 26, and the TRIAC 26 is kept to be switched off. Since the resistance of the resistors R1 and R2 in the AC-DC conversion circuit 28 are far greater than the resistance of the stator winding 16 in the motor, a current currently flowing through the stator winding 16 is far less than the current flowing through the stator winding 16 from the time instant t1 to the time instant t2 and generates very small driving force for the rotor 14. Hence, the rotor 14 continues to rotate clockwise due to inertia. In a second positive half cycle of the AC power supply, similar to the first positive half cycle, a current flows through the resistor R1, the resistor R3, the diode D5, and the control electrode G and the second anode T2 of the TRIAC 26 sequentially. The TRIAC 26 is switched on again, and the current flowing through the stator winding 16 continues to drive the rotor 14 to rotate clockwise. Similarly, the resistors R1 and R2 do not consume electric energy since the two nodes A and B are shorted. In the next negative half cycle of the power supply, the current flowing through the two anodes T1 and T2 of the TRIAC 26 is less than the holding current Ihold, the TRIAC 26 is switched off again, and the rotor continues to rotate clockwise due to the effect of inertia.

At a time instant t4, the rotor magnetic field Hb detected by the position sensor 20 changes to be South from North, the AC power supply is still in the positive half cycle and the TRIAC 26 is switched on, the two nodes A and B are shorted, and there is no current flowing through the AC-DC conversion circuit 28. After the AC power supply enters the negative half cycle, the current flowing through the two anodes T1 and T2 of the TRIAC 26 is gradually decreased, and the TRIAC 26 is switched off at a time instant t5. Then the current flows through the second anode T2 and the control electrode G of the TRIAC 26, the diode D6, the resistor R4, the position sensor 20, the resistor R2 and the stator winding 16 sequentially. As the drive current is gradually increased, the TRIAC 26 is switched on again at a time instant t6, the two nodes A and B are shorted again, the resistors R1 and R2 do not consume electric energy, and the output of the position sensor 20 is stopped due to no power is supplied. There is a larger reverse current flowing through the stator winding 16, and the rotor 14 continues to be driven clockwise since the rotor magnetic field is South. From the time instant t5 to the time instant t6, the first zener diode Z1 and the second zener diode Z2 are switched on, hence, there is a voltage output between the two output terminals C and D of the AC-DC conversion circuit 28. At a time instant t7, the AC power supply enters the positive half cycle again, the TRIAC 26 is switched off when the current flowing through the TRIAC 26 crosses zero, and then a voltage of the control circuit is gradually increased. As the voltage is gradually increased, a current begins to flow through the AC-DC conversion circuit 28, the output terminal H1 of the position sensor 20 outputs a low level, there is no drive current flowing through the control electrode G and the second anode T2 of the TRIAC 26, hence, the TRIAC 26 is switched off. Since the current flowing through the stator winding 16 is very small, nearly no driving force is generated for the rotor 14. At a time instant t8, the power supply is in the positive half cycle, the position sensor outputs a low level, the TRIAC 26 is kept to be switched off after the current crosses zero, and the rotor continues to rotate clockwise due to inertia. According to an embodiment of the present invention, the rotor may be accelerated to be synchronized with the stator after rotating only one circle after the stator winding is energized.

In the embodiment of the present invention, by taking advantage of a feature of a TRIAC that the TRIAC is kept to be switched on although there is no drive current flowing though the TRIAC once the TRIAC is switched on, it is avoided that a resistor in the AC-DC conversion circuit still consumes electric energy after the TRIAC is switched on, hence, the utilization efficiency of electric energy can be improved significantly.

Figure 7:
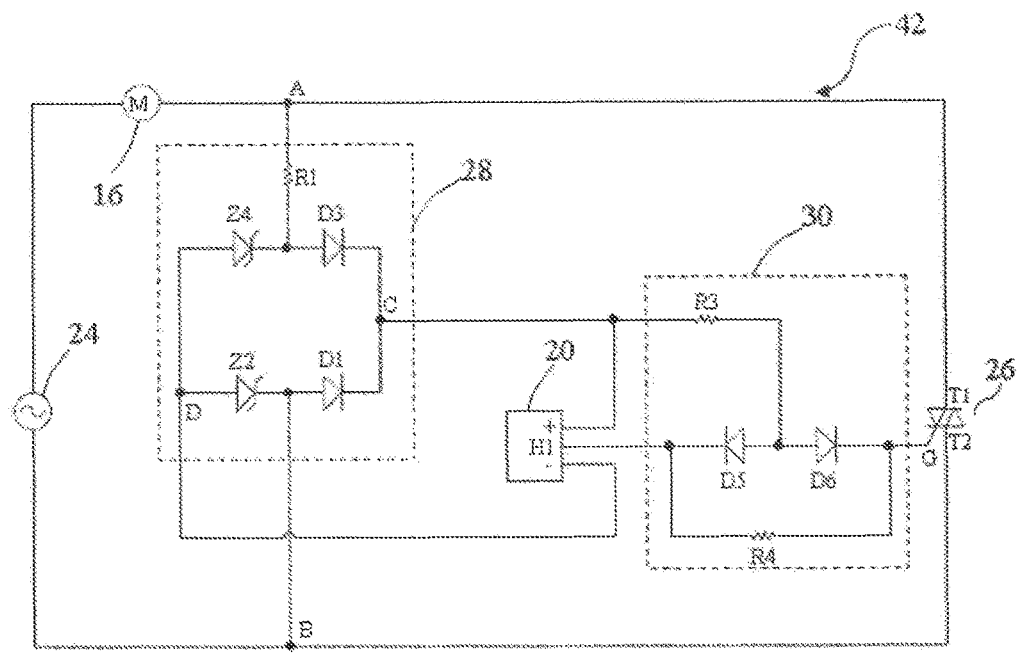
FIGS. 7 to 10 each show a drive circuit of a synchronous motor according to further embodiments of the present invention.

FIG. 7 shows a circuit diagram of a drive circuit 42 for a synchronous motor according to an embodiment of the present disclosure. The stator winding 16 of the synchronous motor is connected in series with the AC power supply 24 between the two nodes A and B. A first anode T1 of the TRIAC 26 is connected to the node A, and a second anode T2 of the TRIAC 26 is connected to the node B. The AC-DC conversion circuit 28 is connected in parallel with the TRIAC 26 between the two nodes A and B. An AC between the two nodes A and B is converted by the AC-DC conversion circuit 28 into a low voltage DC, preferably, a low voltage ranging from 3V to 18V. The AC-DC conversion circuit 28 includes a first resistor R1 and a full wave bridge rectifier connected in series between the two nodes A and B. The full wave bridge rectifier includes two rectifier branches connected in parallel, one of the two rectifier branches includes a first diode D1 and a third diode D3 reversely connected in series, and the other of the two rectifier branches includes a second zener diode Z2 and a fourth zener diode Z4 reversely connected in series, the high voltage output terminal C of the AC-DC conversion circuit 28 is formed at a connection point of a cathode of the first diode D1 and a cathode of the third diode D3, and the low voltage output terminal D of the AC-DC conversion circuit 28 is formed at a connection point of an anode of the second zener diode Z2 and an anode of the fourth zener diode Z4. The output terminal C is connected to a positive power supply terminal of the position sensor 20, and the output terminal D is connected to a negative power supply terminal of the position sensor 20. The switch control circuit 30 includes a third resistor R3, a fourth resistor R4, and a fifth diode D5 and a sixth diode D6 reversely connected in series between the output terminal H1 of the position sensor 20 and the control electrode G of the controllable bidirectional AC switch 26. A cathode of the fifth diode D5 is connected to the output terminal H1 of the position sensor, and a cathode of the sixth diode D6 is connected to the control electrode G of the controllable bidirectional AC switch. One terminal of the third resistor R3 is connected to the high voltage output terminal C of the AC-DC conversion circuit, and the other terminal of the third resistor R3 is connected to a connection point of an anode of the fifth diode D5 and an anode of the sixth diode D6. Two terminals of the fourth resistor R4 are connected to a cathode of the fifth diode D5 and a cathode of the sixth diode D6 respectively.

Figure 8:
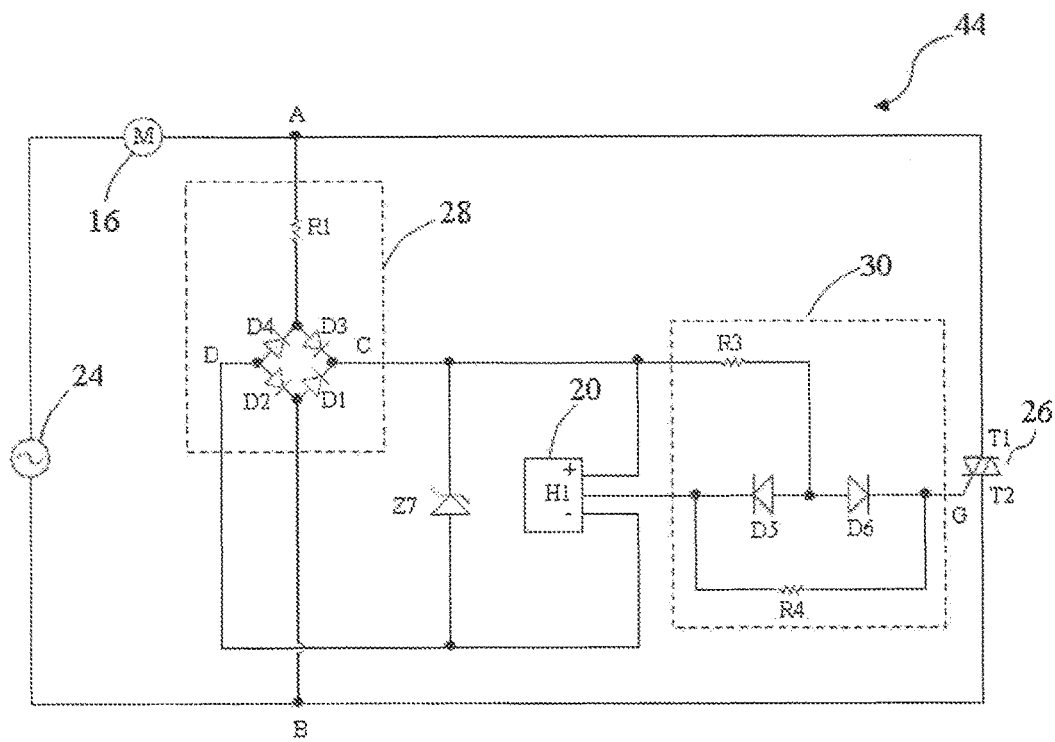

FIG. 8 shows a circuit diagram of a drive circuit 44 for a synchronous motor according to a further embodiment of the present invention. The drive circuit 44 is similar to the drive circuit 42 in the previous embodiment and, the drive circuit 44 differs from the drive circuit 42 in that, the zener diodes Z2 and Z4 in the drive circuit 42 are replaced by general diodes D2 and D4 in the rectifier of the drive circuit 44. In addition, a zener diode Z7 is connected between the two output terminals C and D of the AC-DC conversion circuit 28 in the drive circuit 44.

Figure 9:
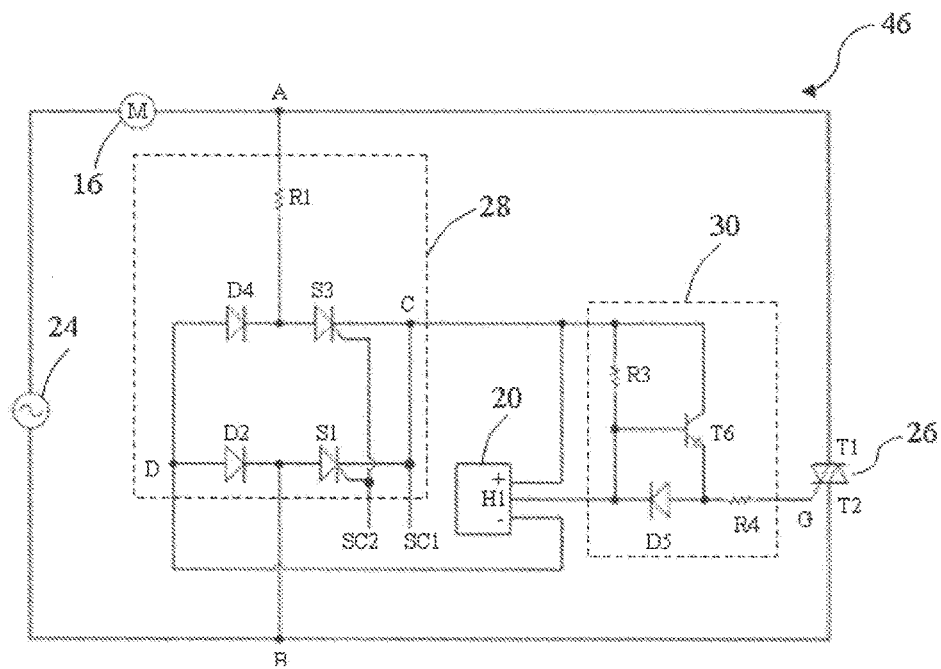

FIG. 9 shows a circuit diagram of a drive circuit 46 for a synchronous motor according to further embodiment of the present invention. The stator winding 16 of the synchronous motor is connected in series with the AC power supply 24 between the two nodes A and B. A first anode T1 of the TRIAC 26 is connected to the node A, and a second anode T2 of the TRIAC 26 is connected to the node B. The AC-DC conversion circuit 28 is connected in parallel with the TRIAC 26 between the two nodes A and B. An AC voltage between the two nodes A and B is converted by the AC-DC conversion circuit 28 into a low voltage DC, preferably, a low voltage ranging from 3V to 18V. The AC-DC conversion circuit 28 includes a first resistor R1 and a full wave bridge rectifier connected in series between the two nodes A and B. The full wave bridge rectifier includes two rectifier branches connected in parallel, one of the two rectifier branches includes two silicon control rectifiers S1 and S3 reversely connected in series, and the other of the two rectifier branches includes a second diode D2 and a fourth diode D4 reversely connected in series. The high voltage output terminal C of the AC-DC conversion circuit 28 is formed at a connection point of a cathode of the silicon control rectifier S1 and a cathode of the silicon control rectifier S3, and the low voltage output terminal D of the AC-DC conversion circuit 28 is formed at a connection point of an anode of the second diode D2 and an anode of the fourth diode D4. The output terminal C is connected to a positive power supply terminal of the position sensor 20, and the output terminal D is connected to a negative power supply terminal of the position sensor 20. The switch control circuit 30 includes a third resistor R3, an NPN transistor T6, and a fourth resistor R4 and a fifth diode D5 connected in series between the output terminal H1 of the position sensor 20 and the control electrode G of the controllable bidirectional AC switch 26. A cathode of the fifth diode D5 is connected to the output terminal H1 of the position sensor. One terminal of the third resistor R3 is connected to the high voltage output terminal C of the AC-DC conversion circuit, and the other terminal of the third resistor R3 is connected to the output terminal H1 of the position sensor. A base of the NPN transistor T6 is connected to the output terminal H1 of the position sensor, an emitter of the NPN transistor T6 is connected to an anode of the fifth diode D5, and a collector of the NPN transistor T6 is connected to the high voltage output terminal C of the AC-DC conversion circuit.

In this embodiment, a reference voltage may be input to the cathodes of the two silicon control rectifiers S1 and S3 via a terminal SC1, and a control signal may be input to control terminals of S1 and S3 via a terminal SC2. The rectifiers S1 and S3 are switched on in a case that the control signal input from the terminal SC2 is a high level, or are switched off in a case that the control signal input from the terminal SC2 is a low level. Based on the configuration, the rectifiers S1 and S3 may be switched between a switch-on state and a switch-off state in a preset way by inputting the high level from the terminal SC2 in a case that the drive circuit operates normally. The rectifiers S1 and S3 are switched off by changing the control signal input from the terminal SC2 from the high level to the low level in a case that the drive circuit fails. In this case, the TRIAC 26, the conversion circuit 28 and the position sensor 20 are switched off, to ensure the whole circuit to be in a zero-power state.

Figure 10:
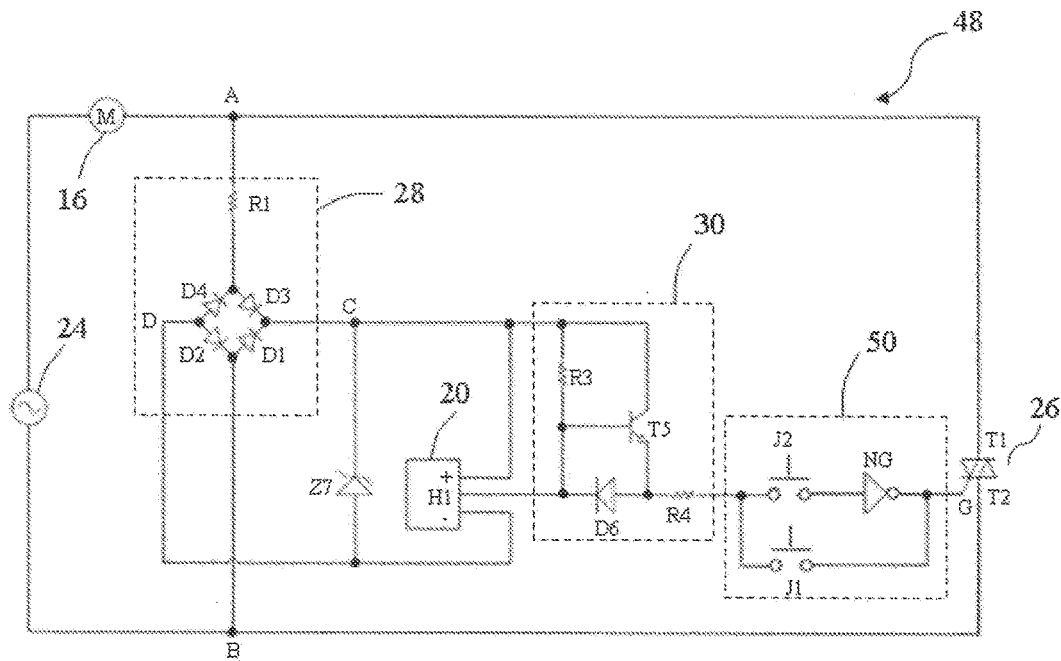

FIG. 10 shows a circuit diagram of a drive circuit 48 for a synchronous motor according to another embodiment of the present invention. The drive circuit 48 is similar to the drive circuit 46 in the previous embodiment and, the drive circuit 48 differs from the drive circuit 46 in that, the silicon control diodes S1 and S3 in the drive circuit 46 are replaced by general diodes D1 and D3 in the rectifier of the drive circuit 48, and a zener diode Z7 is connected between the two terminals C and D of the AC-DC conversion circuit 28. In addition, in the drive circuit 48 according to the embodiment, a preset steering circuit 50 is disposed between the switch control circuit 30 and the TRIAC 26. The preset steering circuit 50 includes a first jumper switch J1, a second jumper J2 switch and an inverter NG connected in series with the second jumper switch J2. Similar to the drive circuit 46, in this embodiment, the switch control circuit 30 includes the resistor R3, the resistor R4, the NPN transistor T5 and the diode D6. One terminal of the resistor R4 is connected to a connection point of an emitter of the transistor T5 and an anode of the diode D6, and the other terminal of the resistor R4 is connected to one terminal of the first jumper switch J1, and the other terminal of the first jumper switch J1 is connected to the control electrode G of the TRIAC 26, and the second jumper switch J2 and the inverter NG connected in series are connected across two terminals of the first jumper switch J1. In this embodiment, when the first jumper switch J1 is switched on and the second jumper switch J2 is switched off, similar to the above embodiments, the rotor 14 still starts clockwise; when the second jumper switch J2 is switched on and the first jumper switch J1 is switched off, the rotor 14 starts counterclockwise. In this case, a starting direction of the rotor in the motor may be selected by selecting one of the two jumper switches to be switched on and the other to be switched off. Therefore, in a case that a driving motor is needed to be supplied for different applications having opposite rotational directions, it is just needed to select one of the two jumper switches J1 and J2 to be switched on and the other to be switched off, and no other changes need to be made to the drive circuit, hence, the drive circuit according to this embodiment has good versatility.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

For example, the drive circuit according to the embodiments of the present invention not only is applied to a synchronous motor, but also is applied to other types of permanent magnetic motors such as a brushless DC motor.

The invention claimed is:

1. A drive circuit for a permanent magnet motor comprising a stator and a permanent magnet rotor, the stator comprising a stator core and a stator winding wound on the stator core and adapted to be connected in series with an AC power source between a first node and a second node, the drive circuit comprising:
   a controllable bidirectional AC switch connected between the first node and the second node;
   an AC-DC conversion circuit connected in parallel with the controllable bidirectional AC switch between the first node and the second node;
   a position sensor configured to detect a magnetic pole position of the permanent magnet rotor; and
   a switch control circuit configured to control the controllable bidirectional AC switch to be switched between a switch-on state and a switch-off state in a predetermined way, based on the magnetic pole position of the permanent magnet rotor and the polarity of the AC power source such that the stator winding drives the rotor to rotate only in a fixed direction,
   wherein the first node and the second node are short circuited when the controllable bidirectional AC switch is conductive and there is no current flowing through the AC-DC conversion circuit when the first node and the second node are short circuited by the controllable bidirectional AC switch.

2. The drive circuit of claim 1, wherein the controllable bidirectional AC switch includes a TRIAC.

3. The drive circuit of claim 2, wherein a first anode of the TRIAC is connected to the first node, a second anode of the TRIAC is connected to the second node, and a control electrode of the TRIAC is connected to the switch control circuit.

4. The drive circuit of claim 3, wherein the AC-DC conversion circuit comprises a full wave rectifying circuit having a high voltage output terminal and a low voltage output terminal.

5. The drive circuit of claim 4, wherein a zener diode is connected between the high voltage output terminal and the low voltage output terminal.

6. The drive circuit of claim 3, wherein the AC-DC conversion circuit comprises a first diode and a second diode which are reversely connected in parallel between the first node and the second node respectively via a first resistor and a second resistor, a high voltage output terminal of the AC-DC conversion circuit is formed at a connection point of the first resistor and a cathode of the first diode, a low voltage output terminal of the AC-DC conversion circuit is formed at a connection point of the second resistor and an anode of the second diode, and the first diode and the second diode are zener diodes.

7. The drive circuit of claim 4, wherein the AC-DC conversion circuit comprises a first resistor connected in series with the full wave bridge rectifier between the first node and the second node.

8. The drive circuit of claim 4, wherein the full wave bridge rectifier comprises two rectifier branches connected in parallel, one of the two rectifier branches comprising a first diode and a third diode reversely connected in series, and the other of the two rectifier branches comprises a second diode and a fourth diode reversely connected in series, the high voltage output terminal of the AC-DC conversion circuit is formed at a connection point of a cathode of the first diode and a cathode of the third diode, and the low voltage output terminal of the AC-DC conversion circuit is formed at a connection point of an anode of the second diode and an anode of the fourth diode.

9. The drive circuit of claim 8, wherein the second diode and the fourth diode are zener diodes.

10. The drive circuit of claim 4, wherein the full wave bridge rectifier comprises two rectifier branches connected in parallel, one of the two rectifier branches comprises two silicon control rectifiers reversely connected in series, and the other of the two rectifier branches comprises a second diode and a fourth diode reversely connected in series, the high voltage output terminal of the AC-DC conversion circuit is formed at a connection point of cathodes of the two silicon control rectifiers, and the low voltage output terminal of the AC-DC conversion circuit is formed at a connection point of an anode of the second diode and an anode of the fourth diode.

11. The drive circuit of claim 10, further comprising: a first signal terminal connected to cathodes of the two silicon control rectifiers and a second signal terminal connected to control terminals of the two silicon control rectifiers, wherein the first signal terminal is connected to a reference voltage; a control signal input from the second signal terminal ensures the two silicon control rectifiers to be switched between a switch-on state and a switch-off state in a predetermined way in a case that the drive circuit operates normally, or a control signal input from the second signal terminal enables the two silicon control rectifiers to be switched off in a case that the drive circuit fails.

12. The drive circuit of claim 1, wherein the AC-DC conversion circuit has a high voltage output terminal and a low voltage output terminal, the switch control circuit comprises a first terminal connected to the high voltage output terminal, a second terminal connected to an output terminal of the position sensor, and a third terminal connected to the control electrode of the controllable bidirectional AC switch, the high voltage output terminal of the AC-DC conversion circuit is connected to a positive power supply terminal of the position sensor, and a low voltage output terminal of the AC-DC conversion circuit is connected to a negative power supply terminal of the position sensor.

13. The drive circuit of claim 12, wherein a preset steering circuit is disposed between the third terminal of the switch control circuit and the control electrode of the controllable bidirectional AC switch, and the preset steering circuit comprises a first jumper switch connected between the third terminal and the control electrode of the controllable bidirectional AC switch, and a second jumper switch and an inverter connected in series which are connected in parallel with the first jumper switch between the third terminal and the control electrode.

14. The drive circuit of claim 12, wherein the switch control circuit further comprises a third resistor, a fourth resistor, and a fifth diode and a sixth diode reversely connected in series between the output terminal of the position sensor and the control electrode of the controllable bidirectional AC switch; a cathode of the fifth diode is connected to the output terminal of the position sensor, and a cathode of the sixth diode is connected to the control electrode of the controllable bidirectional AC switch; one terminal of the third resistor is connected to the high voltage output terminal of the AC-DC conversion circuit, and the other terminal of the third resistor is connected to a connection point of an anode of the fifth diode and an anode of the sixth diode; and two terminals of the fourth resistor are connected to a cathode of the fifth diode and a cathode of the sixth diode respectively.

15. The drive circuit of claim 12, wherein the switch control circuit further comprises a third resistor, a fifth diode, and a fourth resistor and a sixth diode connected in series between the output terminal of the position sensor and the control electrode of the controllable bidirectional AC switch; an anode of the sixth diode is connected to the control electrode of the controllable bidirectional AC switch; one terminal of the third resistor is connected to the high voltage output terminal of the AC-DC conversion circuit, and the other terminal of the third resistor is connected to a connection point of an anode of the fifth diode and the output terminal of the position sensor; and a cathode of the fifth diode is connected to the control electrode of the controllable bidirectional AC switch.

16. The drive circuit of claim 12, wherein the switch control circuit further comprises a third resistor, an NPN transistor, and a fourth resistor and a fifth diode connected in series between the output terminal of the position sensor and the control electrode of the controllable bidirectional AC switch; a cathode of the fifth diode is connected to the output terminal of the position sensor; one terminal of the third resistor is connected to the high voltage output terminal of the AC-DC conversion circuit, and the other terminal of the third resistor is connected to the output terminal of the position sensor; and a base of the NPN transistor is connected to the output terminal of the position sensor, an emitter of the NPN transistor is connected to an anode of the fifth diode, and a collector of the NPN transistor is connected to the high voltage output terminal of the AC-DC conversion circuit.

17. The drive circuit of claim 1, wherein a non-uniform gap is formed between the stator and the permanent magnet rotor, and a polar axis of the permanent magnet rotor has an angular offset relative to a central axis of the stator when the permanent magnet rotor is at rest.

18. The drive circuit of claim 1, wherein the permanent magnetic rotor operates at a constant rotational speed of 60 f/p during a steady state operation of the motor, where f is a frequency of the AC power source and p is the number of pole pairs of the rotor.

19. A drive circuit for an electric motor adapted to be connected in series with an AC power source between a first node and a second node, the drive circuit comprising: a controllable bidirectional AC switch; an AC-DC conversion circuit connected in parallel with the controllable bidirectional AC switch between the first node and the second node, wherein the first node and second node are short circuited when the controllable bidirectional AC switch is conductive and there is no current flowing through the AC-DC conversion circuit when the controllable bidirectional AC switch is conductive; a position sensor configured to detect a position of a rotor of the motor; and a switch control circuit configured to control the controllable bidirectional AC switch to be conductive or non-conductive in a preset way based on the position of the rotor and a polarity of the AC power source.

20. A drive circuit for a synchronous motor comprising a stator and a rotor rotatable relative to the stator, the stator comprising a stator core and a stator winding wound on the stator core and adapted to be connected in series with an AC power source between a first node and a second node, the rotor comprising at least one permanent magnet and operating at a constant rotational speed of 60 f/p during a steady state phase of the motor, where f is a frequency of the AC power supply and p is the number of pole pairs of the rotor, wherein the drive circuit comprises: a controllable bidirectional AC switch; an AC-DC conversion circuit connected in parallel with the controllable bidirectional AC switch between the first node and the second node, wherein the first node and second node are short circuited when the controllable bidirectional AC switch is conductive and there is no current flowing through the AC-DC conversion circuit in the case the controllable bidirectional AC switch is conductive; a position sensor configured to detect a position of the rotor; and a switch control circuit configured to control the controllable bidirectional AC switch to be conductive or non-conductive in a preset way based on the position of the rotor and a polarity of the AC power source such that the stator winding drives the rotor to rotate only in a predetermined direction during a starting phase of the motor.

* * * * *